United States Patent [19]
Seki

[11] 4,033,673
[45] July 5, 1977

[54] ERASABLE VISUAL IMAGE DISPLAY DEVICE

[75] Inventor: Hajime Seki, San Jose, Calif.

[73] Assignee: International Business Machines Corporation, Armonk, N.Y.

[22] Filed: May 17, 1976

[21] Appl. No.: 686,974

[52] U.S. Cl. .......................................... 350/160 R
[51] Int. Cl.$^2$ .......................................... G02F 1/36
[58] Field of Search .................. 350/160 R; 96/1 E

[56] References Cited

UNITED STATES PATENTS

| | | | |
|---|---|---|---|
| 3,453,038 | 7/1969 | Kissa et al. | 350/160 R |
| 3,589,896 | 6/1971 | Wilcox | 350/160 R |
| 3,840,288 | 10/1974 | Schnatterly | 350/160 R |
| 3,986,771 | 10/1976 | Tsukada | 350/160 R |

Primary Examiner—William L. Sikes
Attorney, Agent, or Firm—Joseph E. Kieninger

[57] ABSTRACT

An erasable visual image display device contains a pair of conductive electrodes in spaced relationship. One electrode has a cation permselective membrane thereon and the other electrode has an anion permselective membrane thereon. Positioned between the two membranes is a recording medium having the properties of being both photoionizable and capable of electrochemically producing colored species. The medium contains an electrochemically reversible acceptor molecule, for example, 1, 2, 4, 5 tetracyanobenzene and an electrochemically reversible donor molecule, for example, 1-phenyl-3 diethylaminostyrl 5-diethylaminophenyl $\Delta^2$ pyrazoline.

9 Claims, 1 Drawing Figure

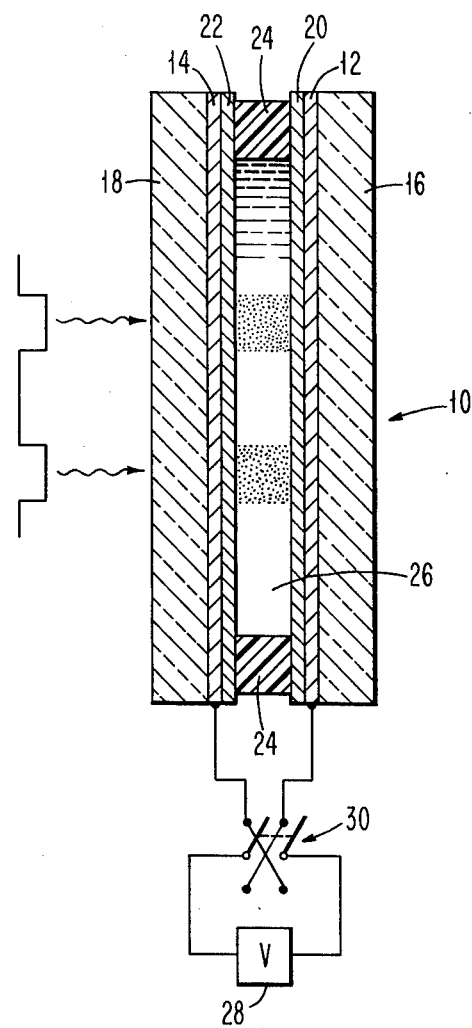

ERASABLE VISUAL IMAGE DISPLAY DEVICE

FIELD OF THE INVENTION

This invention relates to optically addressable display devices and more particularly to devices that can be erased.

BRIEF DESCRIPTION OF PRIOR ART

Many different approaches to direct view display devices are known. One approach is to use a photochromic material in a display device to produce a direct view image. However, these devices are of relatively low optical sensitivity and require the use of thermal or in some cases visible radiation to erase the image and allow subsequent reuse.

The prior art also teaches the use of structural electrode arrays to produce electrochromic images in the form of characters and images. There is a one-to-one correspondence between the electrodes or activated electrode segment and the resulting image. This in general reduces the versatility of the device due to preconfiguration requirements and also presents certain difficulties in addressing and driving the display.

Another approach is to use a device with a photoconductive material overlaying an electrochromic material. The optical image reduces the resistance of the photoconductive material in the exposed area so that the corresponding area of the electrochromic material is energized by a voltage across the cell. This configuration solves the electrode problem of electrochromic devices but requires a more complex structure due to the layered structure. The materials must be selected for compatibility with all the other materials. Furthermore, the exposure and application of the voltage must be simultaneous unless a persistent photoconductor is used.

Still another approach is described in copending patent application Ser. No. 582,045 filed May 29, 1975 and assigned to the assignee of the present invention. This application is included herein by reference thereto. The direct view display device described in that application includes a pair of conductive electrodes in spaced relationship and a suitable recording medium occupying the space between the electrodes. The recording medium exhibits the properties of being photoionizable and capable of electrochemically producing colored species. The image is produced by exposing the medium to an optical pattern of activating radiation of an intensity suitable to produce a latent image of the pattern and then applying a low voltage of a first polarity across the electrodes to produce a very dense image corresponding to the pattern. The image can be erased by applying a low voltage of opposite polarity across the electrodes and the display device can then be reused. These devices are suitable for many applications. In some instances, however, it is desirable to improve the erasability characteristics.

The use of permselective membranes in electrochromic devices are disclosed in the patent to Kissa et al, U.S. Pat. Nos. 3,453,038 and to Anderson, 3,303,488. Kissa et al discoses a single transparent permselective membrane which serves a partition to divide the electrochromic cell into an anode compartment and a cathode compartment. This partition further segregates the color change reaction from the cell balancing reaction. The permselective membrane is permeable to electrolyte ions, that is, ions formed in an aqueous solution. The membrane is not permeable to the redox species, that is, the species that form the color.

SUMMARY OF THE INVENTION

It is a primary object of this invention to provide an improved visual image display device.

It is another object of this invention to provide a visual image display device adapted to the easily erased and reused.

These and other objects are accomplished by an erasable visual image display device having two conductive electrodes in spaced relationship. On one electrode is an anion permselective membrane and on the other electrode is a cation permselective membrane. Positioned between the membranes is a medium which is both photoionizable and capable of electrochemically producing colored species. The medium contains a solvent, an electrochemically reversible donor molecule, for example, 1 phenyl-3 diethylaminostyryl 5-diethylamino $\Delta^2$ pyrazoline (hereinafter referred to as DEASP), and an electrochemically reversible acceptor molecule, for example, 1, 2, 4, 5 tetracyanobenzene. The image is produced by exposing the medium to an optical pattern of activating radiation of an intensity suitable to produce a latent image of the pattern and then applying a low voltage of a first polarity across the electrodes to produce a very dense image corresponding to the pattern. When DEASP is used in the medium as the donor molecule, the stable radical DEASP+ cation is formed and is responsible for the colored image. The image can be erased by applying a low voltage of opposite polarity across the electrodes. Applying the opposite polarity voltage causes the donor radical cation, for example DEASP+, to pass through the cation permselective membrane and be discharged at the electrode to form a neutral molecule. Similarly, the acceptor radical anion passes through the anion permselective membrane and is discharged at the electrode to form a neutral molecule. The display device can then be reused.

Other objects of this invention will be apparent from the following detailed description, reference being made to the accompanying drawing wherein a specific embodiment of the invention is shown.

BRIEF DESCRIPTION OF THE DRAWING

The drawing is a cross-sectional view of the display device embodying the invention.

DESCRIPTION OF THE ILLUSTRATIVE EMBODIMENT

The visual image display device 10 contains transparent electrodes 12 and 14 on substrates 16 and 18, respectively. The transparent electrodes 12 and 14 are typically NESA material, that is, SnO, InO and mixtures thereof or it may be a thin layer of gold, platinum or equivalent materials. The substrates 16 and 18 are typically glass although equivalent transparent materials may be used.

In accordance with this invention transparent electrode 12 has a cation permselective membrane 20 thereon and transparent electrode 14 has an anion permselective membrane 22 thereon. The cation permselective membrane 20 will prevent the discharge of the anion on electrode 12 while the anion permselective membrane 22 will prevent discharge of the cation on electrode 14. These membranes are made of materials commonly known as ion-exchange resins and their permselective properties with respect to ions are applied in this invention. The most suitable type of such materials for this application are the polyelectrolytes which are polymeric materials whose monomeric units possess ionizable groups. These groups are usually acidic (polyacid) or basic (polybase) depending on whether they are to be cation permselective or anion permselective. Examples of polyacids are polyacrylic acid and polystyrenesulfonic acid. Polyvinylamine and polyvinyl pyridine are examples of polybases. These materials and molecular weights are chosen so that the membranes do not dissolve in the solution but are permeable to the solvent molecules and the appropriate neutral donor and acceptor molecules besides being chemically inert with respect to them.

The spacing between the membrane 20 and 22 is maintained by a suitable spacer member 24. Positioned within the space formed by spacer members 24 and membranes 20 and 22 is recording material 26. The thickness of the cell is normally in the range of 50 to 100 microns, and this thickness is chosen on the basis of the desired response time, resolution and other characteristics chosen for a specific display device.

The recording medium 26 exhibits the properties of being both photoionizable and capable of electrochemically producing colored species. In accordance with this invention the recording medium 26 includes the donor molecule able to reversibly generate stable cations through anodic oxidation and acceptor molecules which can be reversibly generated stable anions through cathodic reduction. A number of suitable materials for providing reversible donor molecules are the triayrl pyrazolines and spiropyrans of such as are disclosed in the aforementioned copending patent application. A preferred donor molecule is formed with 1-phenyl-3-diethylaminostyr -5-diethylaminophenyl - $\Delta^2$ - pyrazoline. Compounds which provide a suitable acceptor molecule are 1, 2, 4, 5 tetracyanobenzene, 1, 2 dicyanobenzene; 1, 4 dicyanobenzene and furmaric nitrile.

Suitable solvents for use in the recording medium 26 are halogenated hydrocarbon solvents, non-aqueous solvents such as acetronitrile and tetrahydrofuran. Preferred solvents are chloroform, 1, 2, dichloromethane and mixtures thereof.

The display cell 10 is fully transparent under ambient light. However, when a region of a cell is exposed by light distribution as shown in the drawing to the light of the wavelength to which the material 26 is sensitive with an energy density of about 10 to 50 micron per centimeter squared, a latent image is produced in the irradiated region.

Image enhancement comprises a conversion of the latent image into a high density and high contrast visible image, and the enhancement is achieved by the momentary application of a potential positive on the electrode with the cation permselective membrane to the displaced cell which results in the subsequent production of colored species in those areas that have been exposed to light. In the embodiment shown in the drawing, the enhancement is accomplished by the application of potential of about 2 to 20 volts from voltage source 28 by switch 30 to the device so that the coloration in the same region is intensified. The intensification is proportional to the applied voltage and the duration of its application.

The latent image that is formed by the photoionization process is thought to consist of a contrast of ion densities, i.e., a high concentration of ions in the illuminated regions in contrast to a low concentration in the non-illuminated regions. When the enhancing voltage is applied the ions separate to their respective electrodes but are not discharged due to the presence of the permselective membrane. For example, the DEASP cations form a layer next to the anion permselective membrane and the tetracyanobenzene anions form a layer next to the cation permselective membrane. Thus, an effective double layer is formed allowing electrochemistry to take place in the illuminated area whereas in the non-illuminated area the ion density is too low for electrochemistry to take place.

During the application of the potential the donor molecule is oxidized at the anode to form the cation while the acceptor molecule is reduced at the cathode to form the anion. Either the cation or the anion or both are chosen to absorb light in the visible spectrum to form the desired color. In the preferred embodiment the color is formed by the donor molecule.

The display device is erased by reversing the potential on the cell by switch 30 which causes the colored species to be bleached. In accordance with this invention the presence of the cation permselective membrane on one electrode and the anion permselective membrane on the other electrodes insures that both the cation and the anion will be discharged at the appropriate electrode thereby insuring the successful erasure of the device. For example, the DEASP cations which were in a layer next to the anion permselective membrane migrate to and penetrate through the cation permselective membrane to the electrode where they are discharged to form the original neutral donor molecules suitable for reuse. Similarly the tetracyanobenzene anions which were in a layer next to the cation permselective membrane migrate to and penetrate through the anion permselective membrane to the electrode where they are discharged to form the original neutral acceptor molecules suitable for reuse. It is also necessary, of course, to have donor and acceptor molecules which are electrochemically reversible.

Although a preferred embodiment of this invention has been described, it is understood that numerous variations may be made in accordance with the principles of this invention.

I claim:

1. A visual image display device comprising:
   a first and a second conductive electrode in spaced-relationship;
   a cation permselective membrane on said first electrode,
   an anion permselective membrane on said second electrode,
   a voltage source and means for selectively applying this voltage between the electrodes to produce an electric field; and
   a normally light transmitting recording medium occupying the space between said electrodes, said medium having the properties of being both photoionizable and capable of electrochemically producing colored species.

2. A device as described in claim 1 wherein said medium contains an organic solvent.

3. A device as described in claim 1 wherein said first and said second electrodes are semitransparent.

4. A visual image display device comprising:
   a first and a second conductive electrode in spaced-relationship;

a cation permselective membrane on said first electrode, an anion permselective membrane on said second electrode, a voltage source and means for selectively applying this voltage between the electrodes to produce an electric field; and a normally light transmitting recording medium occupying the space between said electrodes, said medium having the properties of being both photoionizable and capable of electrochemically producing colored species; said medium contains an electrochemically reversible donor molecule and an electrochemically reversible acceptor molecule.

5. A device as described in claim 4 wherein said donor molecule forms a radical ion adapted to absorb light in the visible spectrum to form the desired color.

6. A device as described in claim 4 wherein said acceptor molecule forms a radical ion adapted to absorb light in the visible spectrum to form the desired color.

7. A device as described in claim 4 wherein said acceptor molecule is taken from the group consisting of:

1, 2, 4, 5 tetracyanobenzene, 1, 2 dicyanobenzene; 1, 4, dicyanobenzene and furmaric nitrile.

8. A device as described in claim 4 wherein said donor molecule is taken from the group consisting of triaryl - $\Delta^2$ - pyrazoline and spiropyrans.

9. A device as described in claim 4 wherein said donor molecule is 1-phenyl-3-diethylaminostyrl-5-diethylaminophenyl - $\Delta^2$ -pyrazoline.

* * * * *